United States Patent [19]

Evans, Jr. et al.

[11] Patent Number: 5,051,906
[45] Date of Patent: Sep. 24, 1991

[54] MOBILE ROBOT NAVIGATION EMPLOYING RETROREFLECTIVE CEILING FEATURES

[75] Inventors: John M. Evans, Jr., Brookfield; Steven J. King, Woodbury; Carl F. R. Weiman, Westport, all of Conn.

[73] Assignee: Transitions Research Corporation, Danbury, Conn.

[21] Appl. No.: 363,601

[22] Filed: Jun. 7, 1989

[51] Int. Cl.⁵ ............................................ G06F 15/50
[52] U.S. Cl. ............................... 364/424.02; 364/449; 358/103; 180/169
[58] Field of Search ............... 364/424.02, 424.01, 364/443, 447, 449, 460; 180/167, 168, 169; 356/141, 3; 358/103; 318/587; 382/22

[56] References Cited

U.S. PATENT DOCUMENTS

| | | | |
|---|---|---|---|
| 3,187,185 | 6/1965 | Milnes | 356/1 |
| 3,610,754 | 10/1971 | Pirlet | 356/1 |
| 4,119,900 | 10/1978 | Kremnitz | 364/424.02 |
| 4,309,748 | 1/1982 | Halsall et al. | 363/65 |
| 4,482,960 | 11/1984 | Pryor | 364/424.02 |
| 4,500,970 | 2/1985 | Daemmer | 364/513 |
| 4,530,057 | 7/1985 | Ahlbom | 180/168 |
| 4,558,215 | 12/1985 | Kaneko et al. | 250/222.1 |
| 4,566,032 | 1/1986 | Hirooka et al. | 358/103 |
| 4,584,704 | 4/1986 | Ferren | 356/3 |
| 4,611,292 | 9/1986 | Ninomiya et al. | 364/559 |
| 4,620,285 | 10/1986 | Perdue | 364/513 |
| 4,626,995 | 12/1986 | Lofgren et al. | 364/449 |
| 4,627,511 | 12/1986 | Yajima | 180/167 |
| 4,628,453 | 12/1986 | Kamejima et al. | 364/424.02 |
| 4,630,109 | 12/1986 | Barton | 358/103 |
| 4,653,316 | 3/1987 | Fukuhara | 73/146 |
| 4,668,859 | 5/1987 | Winterer | 250/221 |
| 4,679,152 | 7/1987 | Perdue | 364/513 |
| 4,706,195 | 11/1987 | Yoshino et al. | 364/426.04 |
| 4,729,660 | 3/1988 | Tsumura et al. | 356/375 |
| 4,786,167 | 11/1988 | Rothbone et al. | 356/141 |
| 4,790,402 | 12/1988 | Field et al. | 180/169 |
| 4,796,198 | 1/1989 | Boultinghouse et al. | 364/513 |
| 4,815,008 | 3/1989 | Kadonoff et al. | 364/513 |
| 4,819,169 | 4/1989 | Saitoh et al. | 364/424.02 |
| 4,846,297 | 7/1989 | Field et al. | 364/424.02 |
| 4,855,915 | 8/1989 | Dallaire | 364/424.02 |
| 4,858,132 | 8/1989 | Holmquist | 364/424.02 |
| 4,862,047 | 8/1989 | Suzuki et al. | 358/103 |
| 4,868,752 | 9/1989 | Fujii et al. | 358/103 |
| 4,905,151 | 2/1990 | Weiman et al. | 364/424.02 |
| 4,918,607 | 4/1990 | Wible | 364/443 |
| 4,933,864 | 6/1990 | Evans, Jr. et al. | 364/449 |
| 4,947,094 | 8/1990 | Dyer et al. | 318/587 |
| 4,951,213 | 8/1990 | Baxter et al. | 364/449 |

Primary Examiner—Parshotam S. Lall
Assistant Examiner—Michael Zanelli
Attorney, Agent, or Firm—Perman & Green

[57] ABSTRACT

Apparatus and method which provides for the determination of a vehicle's orientation and position in an environment, such as a hallway, from an image of a retroreflective ceiling feature. A mobile robot 10 includes a light source 28 and a camera 12 that are pitched up obliquely at an intermediate angle between a horizon and a zenith. The camera views a ceiling having one or more strip-like retroreflective features 16 which are preferably aligned with an axis of the hallway. In that the feature presents a pattern or alignment which is substantially parallel to a long axis of the hallway the pattern is detected and processed to derive robot navigation information therefrom.

25 Claims, 6 Drawing Sheets

MOBILE ROBOT NAVIGATION EMPLOYING RETROREFLECTIVE CEILING FEATURES

FIELD OF THE INVENTION

This invention relates generally to navigation of a moving vehicle such as a mobile robot and, in particular, to a vision system which includes a light source and a camera carried by the vehicle which views a retroreflective feature on the ceiling and which infers navigation data from the alignment thereof.

BACKGROUND OF THE INVENTION

A moving autonomous vehicle, such as a mobile robot, typically includes some type of sensor system for sensing an environment through which the vehicle navigates. Systems employing ultrasonic detectors, mechanical contact devices and laser ranging apparatus are known in the art. Other systems which include a camera to observe the environment and a passive three dimensional image processing system are also known.

A problem associated with traditional three dimensional passive scene analysis vision systems is that such systems require large amounts of computing power. Such systems are also relatively slow and often yield erroneous results. Typically the interpretation of data is too slow to be useful for real time navigation, and may prove erroneous, such as interpreting a shadow as an object, which results in navigation errors. In that the vision system is preferably carried by the robot and is powered by the robot's battery, the size and power consumption of the image processing system are important considerations.

Another problem associated with conventional image analysis systems is related to the often visually "rich" images which the system is required to analyze. For example, in a typical hospital environment a hallway may contain a number of stationary objects, such as laundry carts, meal carts and medical equipment, in addition to a number of moving objects such as employees and patients. In order to navigate rapidly and accurately through such an environment sophisticated and time consuming image analysis techniques are required.

Commercial applications of mobile robots in the service sector include floor cleaning, aids to the handicapped, hospital delivery systems, mail carts, and security. These applications require robust, reliable navigation using sensors which are low in cost and power consumption while providing real-time maneuvering data.

It is therefore one object of the invention to provide a simplification of vision and vision processing for a vehicle, such as a mobile robot.

It is another object of the invention to provide a vision system for a mobile robot, the system requiring a minimum of image processing complexity while yet having an image resolution which is sufficient for guiding the robot through an environment.

It is another object of the invention to provide a vision system for a mobile robot which operates in a high speed manner and which permits the continuous, adaptive motion of the robot through the robot's environment.

It is one further object of the invention to provide a vision system for a mobile robot which analyses a portion of the robot's environment which is relatively visually simple and which is generally free of stationary or moving objects and which further includes a visually distinct reference object or objects.

It is one still further object of the invention to provide a vision system for a mobile robot which views an image of a ceiling disposed above and/or in front of the robot, the vision system inferring navigation related data from the orientation of retroreflective tape on the ceiling.

SUMMARY OF THE INVENTION

The foregoing and other problems are overcome and the objects are realized by, in accordance with the invention, apparatus and method which provide for the determination of vehicle orientation and lateral position in an environment, such as a hallway, from an image of a retroreflective ceiling feature, such as a strip or strips of retroreflective tape or paint. The invention provides for a mobile robot having a zenith gazing camera or a camera that is pitched up obliquely at an intermediate angle between a horizon and the zenith. The ceiling feature is preferably arranged with an axis parallel to a long axis of the hallway. In that the feature presents a pattern of alignment which is substantially parallel the long axis of the hallway the invention advantageously exploits this pattern to derive robot navigation information therefrom.

In accordance with the invention there is disclosed navigation apparatus for generating navigation related information for a vehicle, such as a mobile robot. The apparatus includes means for obtaining an image of a surface which overlies a vehicle or a projected path of the vehicle, the surface having one or more visually distinct retroreflective features disposed thereon; means, coupled to the obtaining means, for detecting within the image a location of the one of more features and means, coupled to the detecting means, for generating, from the detected feature location or locations, vehicle navigation information. The generating means is shown to include means for determining at least an offset distance and an angular displacement of the vehicle relative to the location of the retroreflective feature within the image of the ceiling.

BRIEF DESCRIPTION OF THE DRAWINGS

The foregoing aspects of the invention will be made more apparent in the ensuing Detailed Description of the Invention read in conjunction with the accompanying Drawing wherein:

FIG. 1b is a block diagram of the image processor 18 of FIG. 1a;

DETAILED DESCRIPTION OF THE INVENTION

Figure 1A:
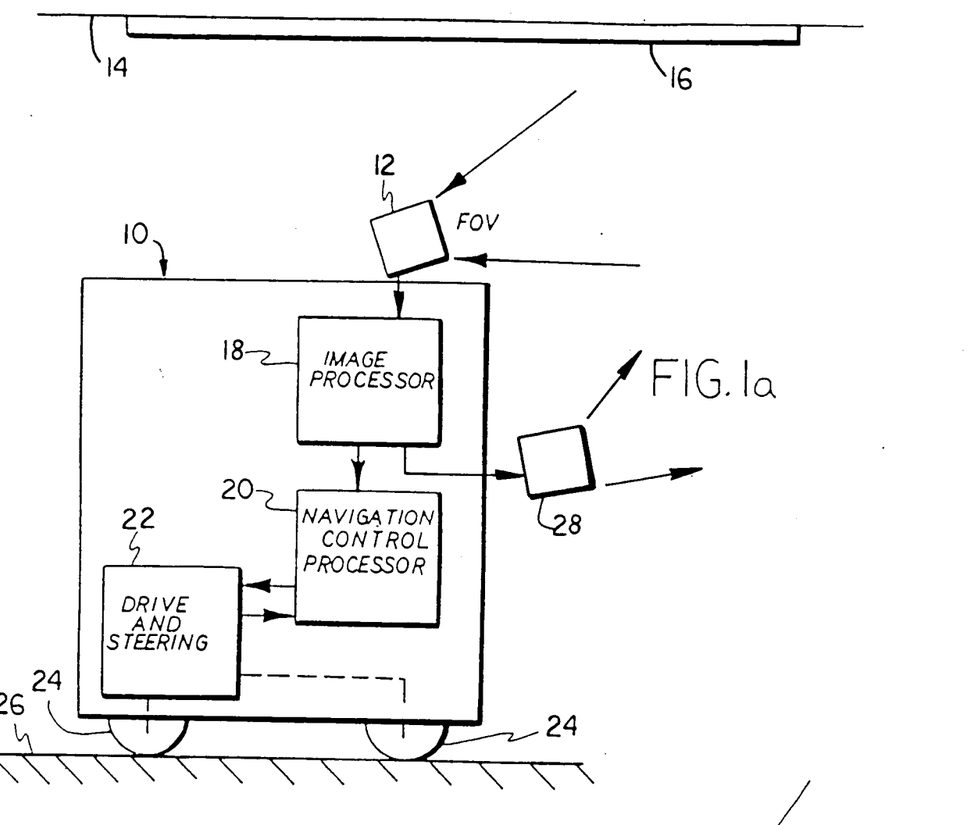
FIG. 1a is an illustrative block diagram showing a mobile robot, constructed and operated in accordance with one embodiment of the invention, which includes a camera having an upwardly pointing field of view for viewing a ceiling above the robot, the ceiling having a strip of retroreflective tape.

Referring now to FIG. 1a there is shown a side view of one embodiment of a mobile robot 10 comprising an electronic imaging device, such as a camera 12. In accordance with the invention this optical configuration is arranged to view a ceiling 14 having a visually distinct retroreflective feature 16, preferably a strip or strips of retroreflective tape or paint. The ceiling 14 is disposed above the desired path of the robot 10. The camera 12 preferably includes a CCD imaging device having a square or rectangular field of view (FOV) which is directed obliquely upward such that it images the ceiling 14 within the forward path of the robot 10. The camera 12 generates a plurality of pixels, individual ones of which have a value indicative of an intensity of radiation incident upon a corresponding surface area of the camera radiation sensing device. Robot 10 further comprises an image processor 18 which is coupled to the output of camera 12. Image processor 18, as shown in greater detail in FIG. 1b, comprises a video memory 18A that stores a representation of one video frame output of camera 12. An input to video memory 18A is provided by an analog to digital (A/D) convertor 18B that digitizes the analog output of camera 12. The digital output of A/D 18B forms an address input to a lookup table (LUT) 18C wherein pixel brightness values are reassigned. The LUT 18C may also be employed for image thresholding and/or histogram correction. Image processor 18 further comprises an image processing device, such as a microcomputer 18D, which is coupled to the video memory 18A and which is operable for reading the stored video frame data therefrom. Image processor 18 further comprises memory 18E which includes memory for storing program instructions, constants and temporary data. The program data is operable for performing calculations of the type which will be described in detail hereinafter. An output of image processor 18 that is expressive of position information relating to retroreflective ceiling features 16 within the field of view, FOV, of camera 12 is supplied, via an RS-232 or parallel data link, to a navigation control processor 20 that derives navigation data based upon the perceived image of the ceiling environment, particularly the orientation of the retroreflective ceiling feature(s). This data may be employed to steer the robot down a hallway or to orient the robot within a coordinate system of a room or other enclosure having the retroreflective ceiling feature(s). An output of navigation control processor 20 is supplied to a drive and steering control 22 that has outputs coupled to drive and steering wheels 24. The wheels 24 are in contact with a supporting surface 26 which is typically a floor. Navigation control processor 20 receives an output from the drive and steering control 22, the output being expressive of odometer readings which relate to the distance traveled by the robot 10. Navigation control processor 20 comprises a data processing device having associated memory and support circuitry. An enclosure is provided to contain the aforementioned apparatus and to provide protection therefore.

Figure 1B:
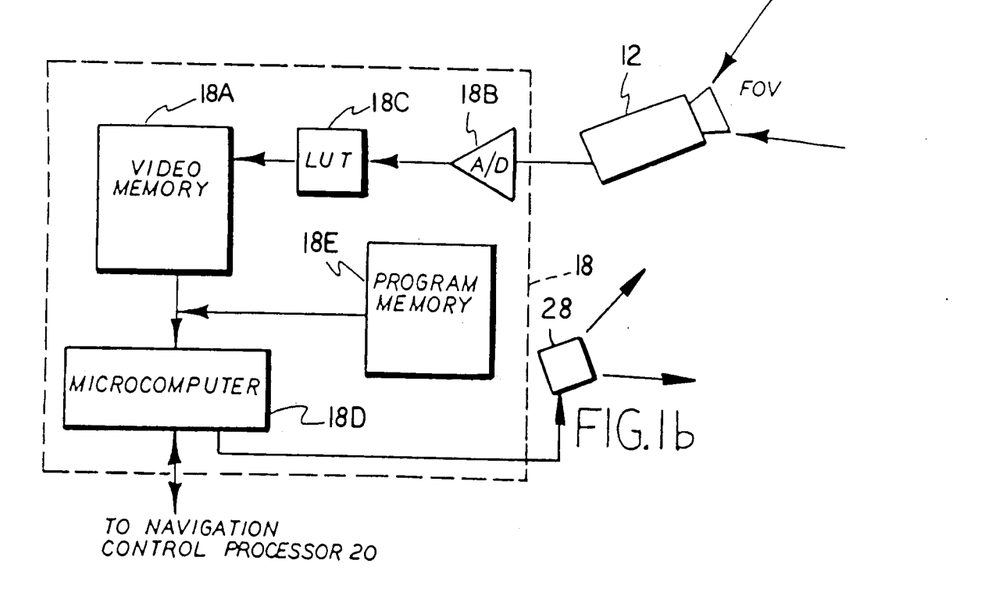
Figure 1C:
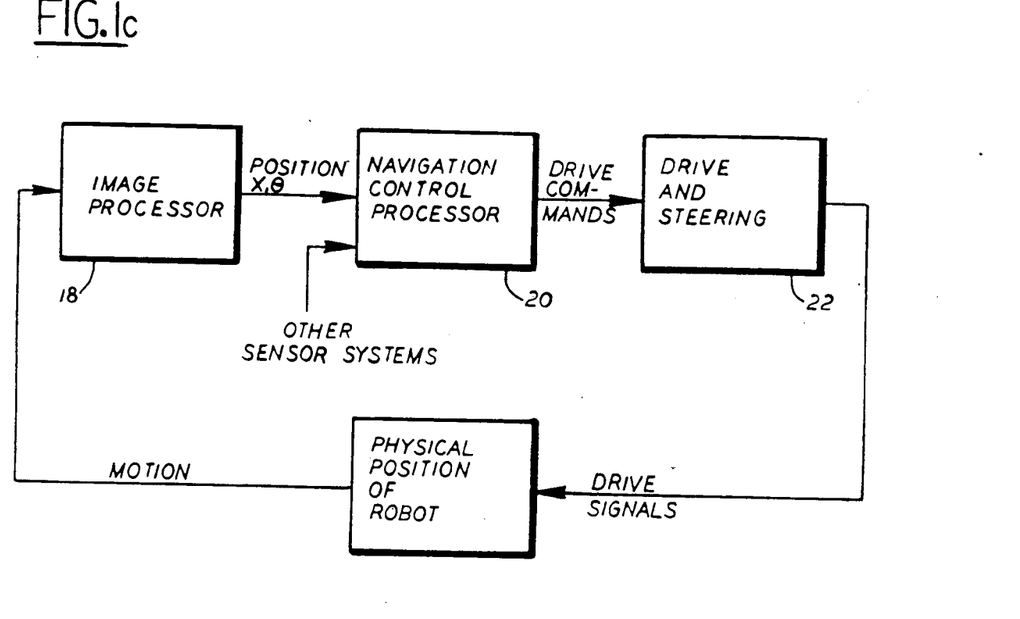
FIG. 1c is a block diagram which illustrates a feedback control system wherein ceiling related position measurements function as an error signal.

As can be seen in FIG. 1c the navigation control processor 20 is generally responsible for interpreting robot 10 position measurements generated by ceiling navigation image processor 18, in conjunction with possible inputs from other sensor systems, to control the drive system 22 in order to guide the robot 10 along a desired path. Thus, position measurements function as an error signal in a feedback control system wherein the drive and steering mechanisms serve as the actuators which change the position of the robot.

The camera 12 may be a model TM440 CCD camera manufactured by Pulnix. The camera 12 may have a relatively short focal length of, for example, 8.5 mm in order to maximize the field of view. Microcomputer 18D may be a member of the 68000 family of microprocessor devices manufactured by Motorola, Inc. LUT 18C and video memory 18A may be contained within a frame grabber pc-board such as a type manufactured by Coreco or Imaging Technologies.

Figure 3A:
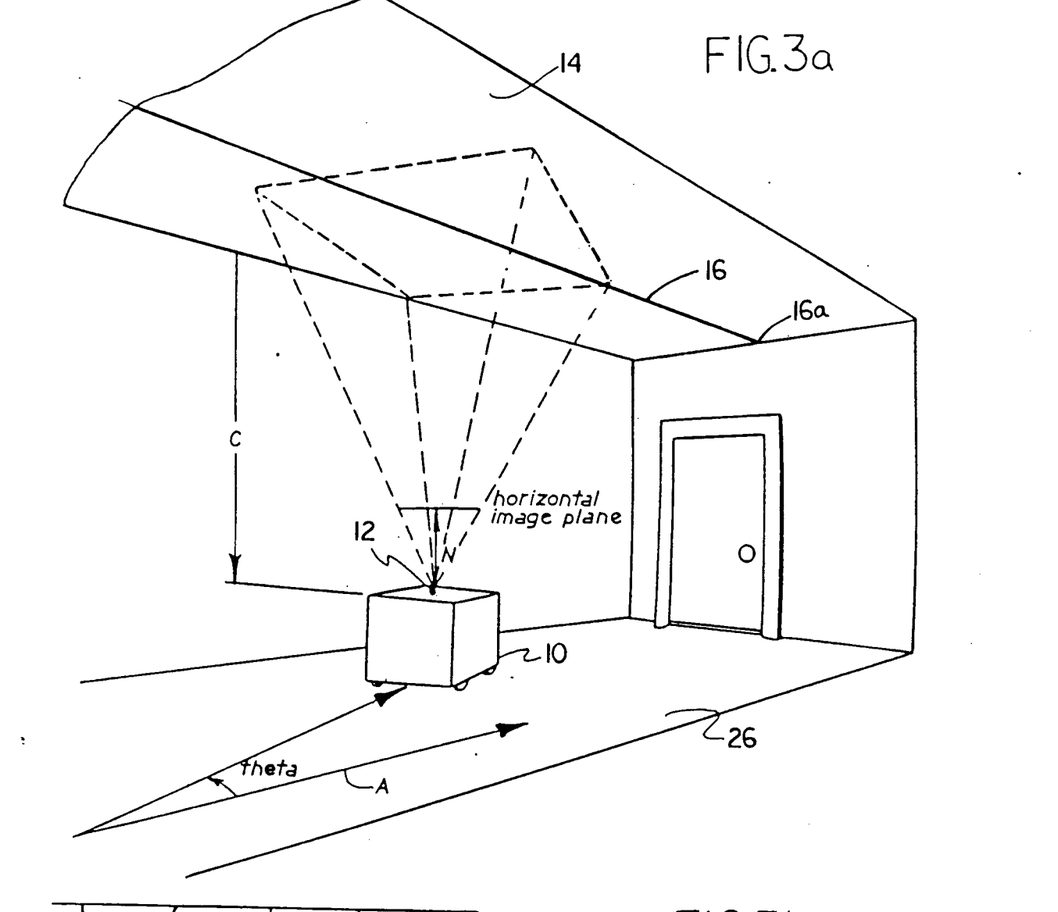
FIGS. 3a, 3b and 3c are illustrative views of a robot within an environment having a retroreflective linear ceiling feature.

Referring briefly to FIG. 3a there is illustrated a typical institutional hallway. In a suitably thresholded camera image the retroreflective feature 16 is the overwhelmingly prominent visual feature. The linear edges, or straight line boundaries, of the feature 16, in accordance with the method and apparatus of the invention, provides a reference line or lines for vehicle navigation. In FIG. 3a it can be seen that the feature 16 is provided with a T-shaped branch 16a at a point where the hallway intersects another hallway. Odometry-based navigation is employed to cross or turn into such intersections with the feature 16 intersections being used as navigational landmarks or check points. Discontinuities or gaps within a feature 16 are accommodated with dead reckoning-type navigation until the retroreflective ceiling feature is once more in view of the camera 12.

The retroreflective ceiling feature 16 is illuminated by a light source 28, preferably comprised of an infrared (IR) flash unit carried by the robot 10. The camera 12 is preferably provided with a visible light blocking filter such that only the IR light retroreflected by the feature 16 is imaged by the camera. The use of IR radiation is advantageous for environments shared with humans in that the operation of the flash unit 28 is not seen. The light source 28 is preferably positioned as close as possible to the lens of the camera 12 to maximize the amount of received retroreflected radiation returned from the feature 16. The use of a retroreflective ceiling feature is desirable in that the feature is not visually prominent unless viewed from a position near the source of illumination. A familiar example of this property is found in road signs whose letters are formed in retroreflective material. The letters appear very bright only to the occupants of a car whose headlights are illuminating the sign. Because observers who are not close to the source of illumination do not receive such strongly reflected light, the operation of the vision system is unobtrusive to humans sharing the environment with the robot. One type of retroreflective ceiling feature that has been found to be suitable is a tape manufactured by the 3M Corporation and referred to as BRT-THG-1-100. This particular tape is one inch in width and has been found to be suitable for use in environments having eight foot ceilings.

As can be appreciated, when searching for and identifying the edges of the retroreflective ceiling feature 16 it is important to examine as few pixels as possible in order to reduce overall processing time. This search operation is facilitated by providing for an image threshold or a camera 12 aperture setting which causes the retroreflective ceiling feature 16 to appear as a bright line embedded within a dark background. A binary threshold technique may then be utilized to identify bright, illuminated pixels from dark pixels. To first locate the feature 16 in the image an initial preliminary search is performed over the image, beginning at the top row of pixels and working towards the bottom row. Once a pixel is detected that has a value above a predetermined search threshold value the preliminary search is terminated. The predetermined threshold value is influenced by such factors as the type of camera employed, the camera aperture setting and/or the particular type of pixel thresholding. The preliminary search is preferably begun from the top of the image such that a feature 16 or portion of a feature that is nearest to the robot will first be detected.

When a pixel above the threshold is detected a method of the invention, as described below, thereafter employs a binary subdivision search. As an example, given a white point or pixel within the strip of ceiling tape there is next located an edge of the tape where a transition from white to black occurs. This may be accomplished by moving outwards from the white point while examining pixel values to detect a transition from a pixel value which corresponds to that of the light to a pixel value which corresponds to the dark background. Of course, the pixel values may not normally correspond to fully white or fully black but will typically be expressed as varying shades of gray. Sampling every pixel while moving towards an edge of the tape may be less than optimum in that the edge may be many pixels removed from the initially detected pixel. Therefore, a preferred method involves stepping initially by some relatively large increment of pixels, such as by 4 pixels per step. Stepping outward in 4 pixel increments continues until a pixel value indicates that the search has entered the dark background. At this time the search increment is divided by two and the search direction is reversed. This process of dividing the stepping increment and reversing the stepping direction continues until the step size is divided down to one. At that point the pixel under consideration is either one pixel into the bright light or one pixel into the dark background. This search technique is repeated, as described below, to detect a second edge of the ceiling tape in order to obtain sufficient information to accurately locate the left or the right edge of the tape.

Figure 4A:
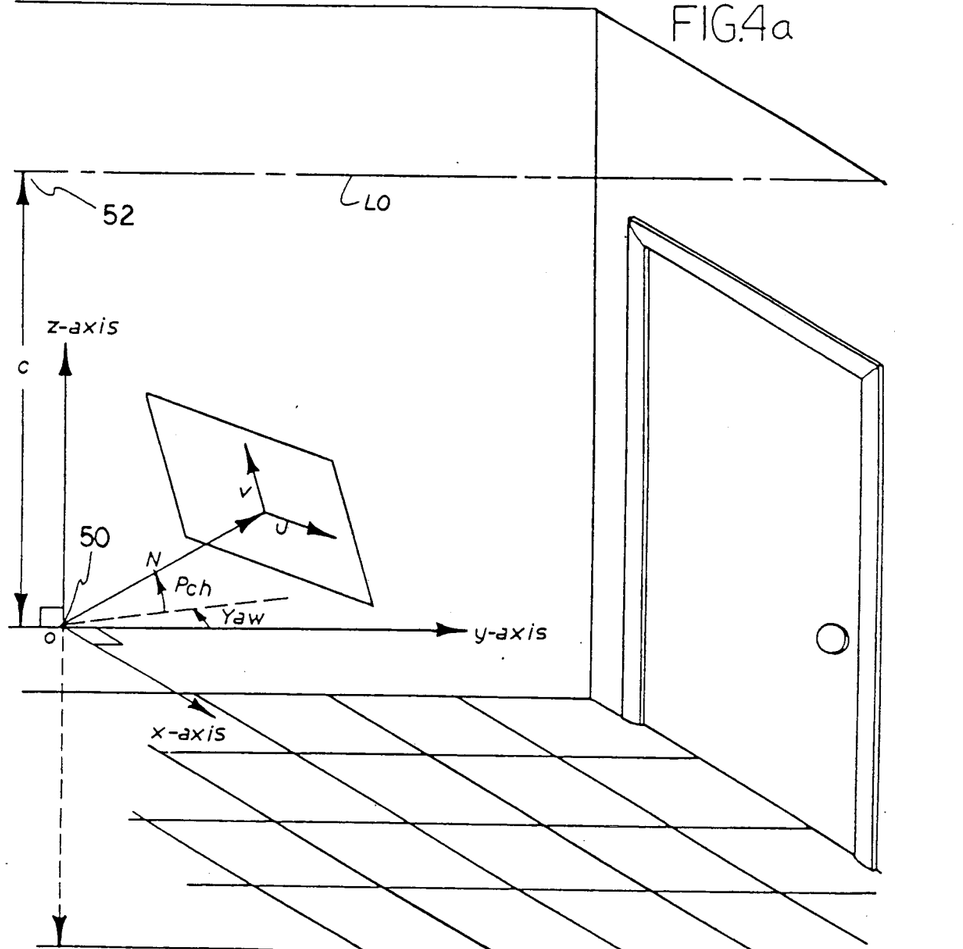
FIGS. 4a, 4b, 4c, 4d, 4e and 4f are graphical representations of the mathematical derivation of robot position relative to the retroreflective ceiling feature.
Figure 4B:
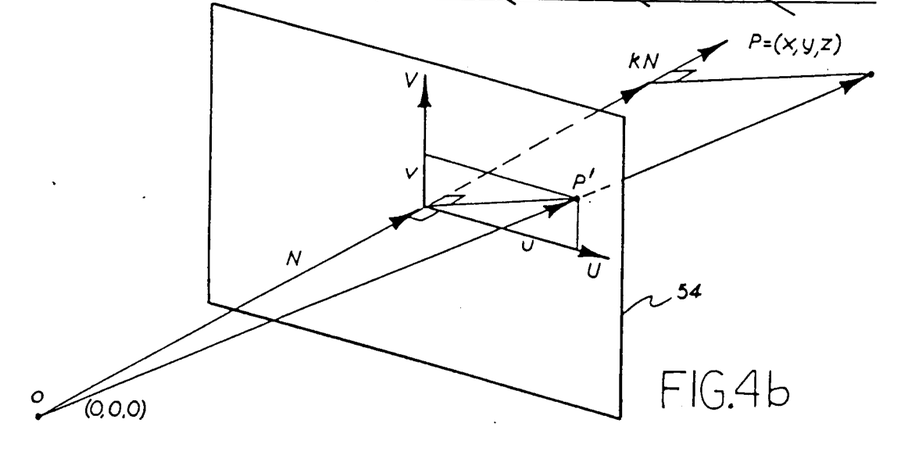
Figure 4C:
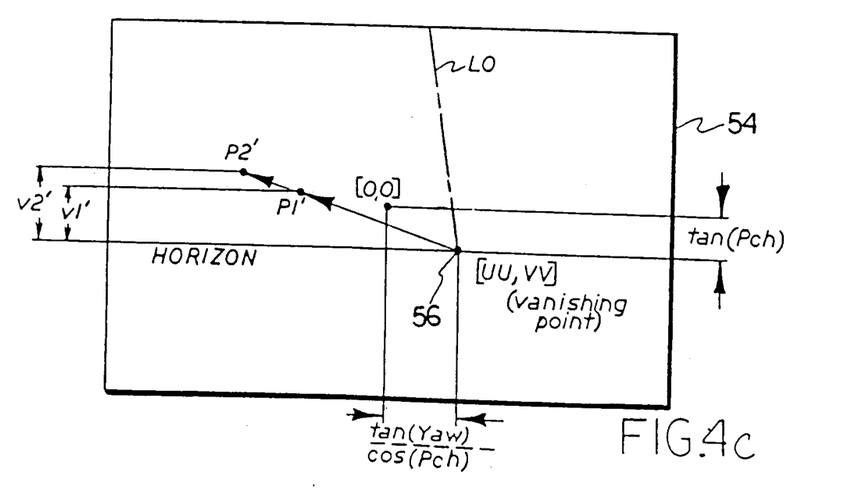
Figure 4D:
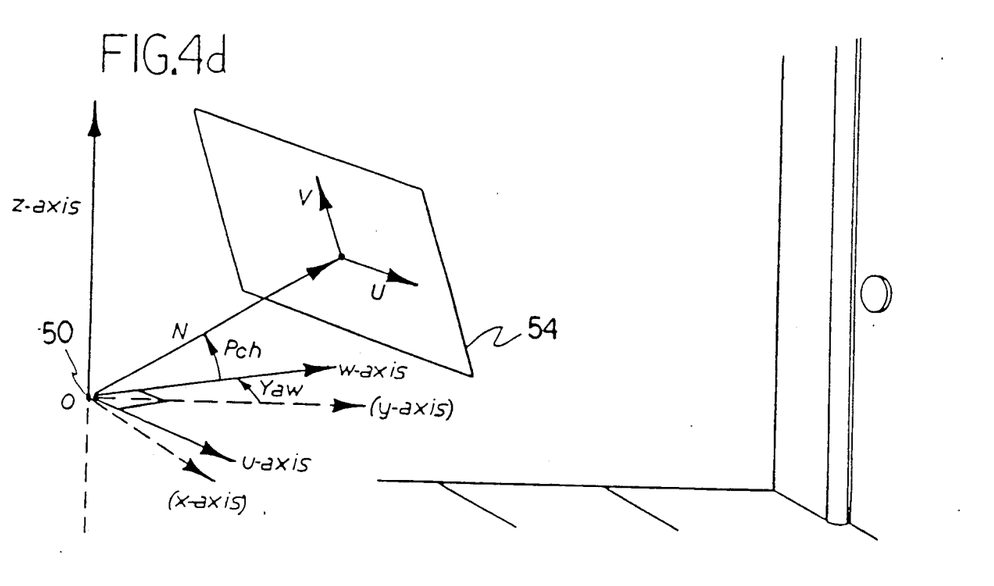
Figure 4E:
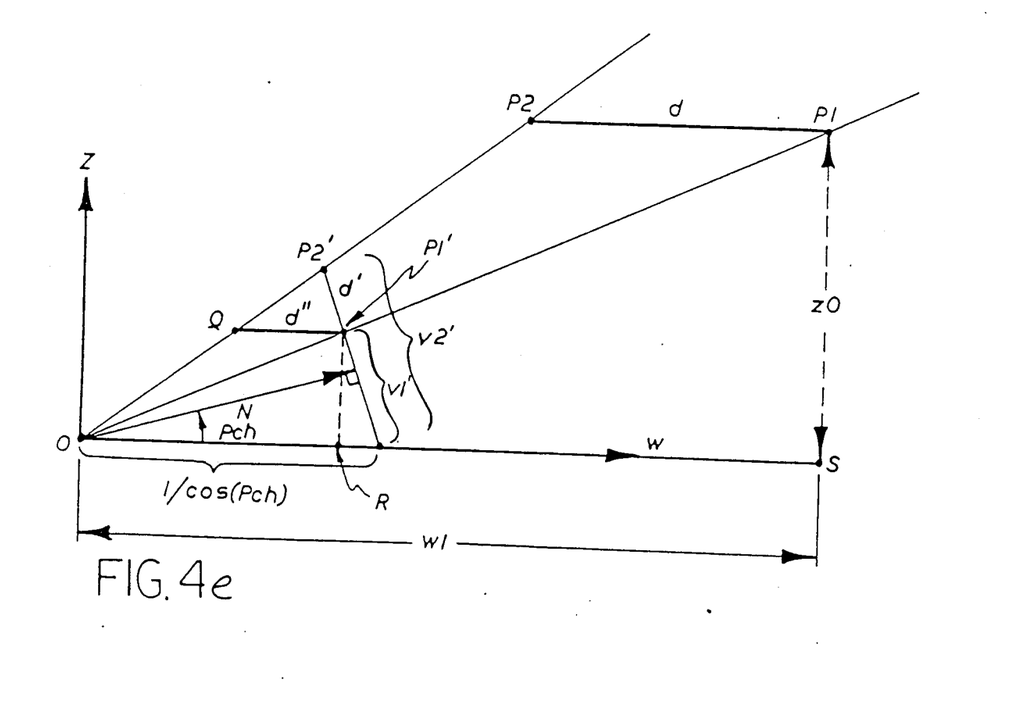
Figure 4F:
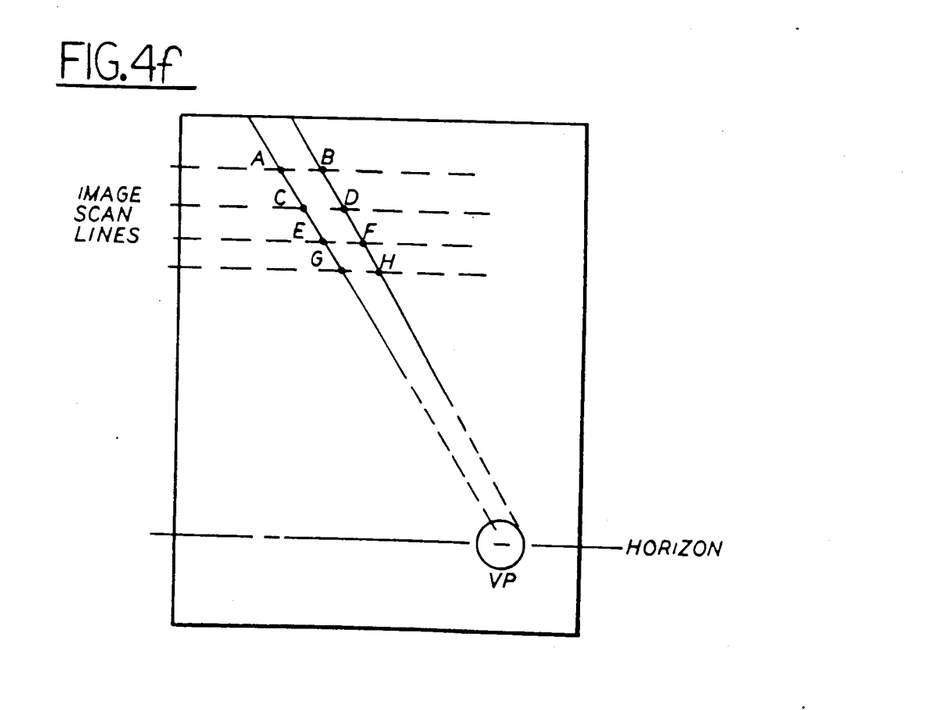

As can be seen in FIGS. 4c and 4f scan lines are searched across the image until a point on the feature 16 is found. A binary subdivision search is used to find the left and right edge (A,B) of the feature 16. Further down the screen another line is searched across the image until a point on the tape is found, and another binary search yields the edges (C, D). Successive scan lines are similarly searched to yield points A, C, E, G, etc. along a left edge and points B, D, F, H along a right edge. The objective is to collect enough points, typically 20, to accurately measure line slope in the image.

It should be realized that the preceding description of a method of locating edges of the ceiling feature 16 is but one suitable technique. For example, known methods of finding straight line patterns in a video image include the use of Hough transforms, edge detection and linking, and curve fitting.

Figure 2A:
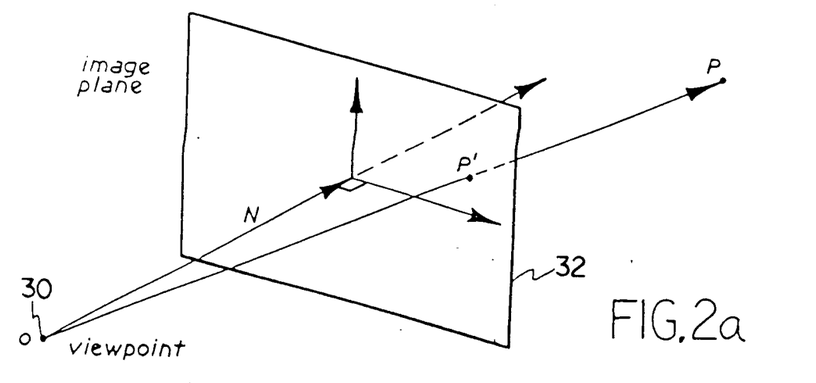
FIGS. 2a and 2b illustrate an image plane of the ceiling vision system.

Referring to FIG. 2a it is shown that the camera 12 configuration is treated geometrically as a viewpoint 30 and an image plane 32. The viewpoint 30 may be considered as the center of the camera lens. Images are projected perspectively from an arbitrary point P in three dimensional space onto point P' in the image plane 32, along a line through the viewpoint 30. It is mathematically convenient to consider the image plane 32 to be a unit distance from the viewpoint 30. N is the unit vector normal to the image plane 32. Thus units of distance measured in the image plane correspond to the tangent of the angle from the normal N through the viewpoint 30 perpendicular to the image plane 32. This convention provides for the scaling of the view angle tangent with respect to camera 12 pixel count as follows.

Figure 2B:
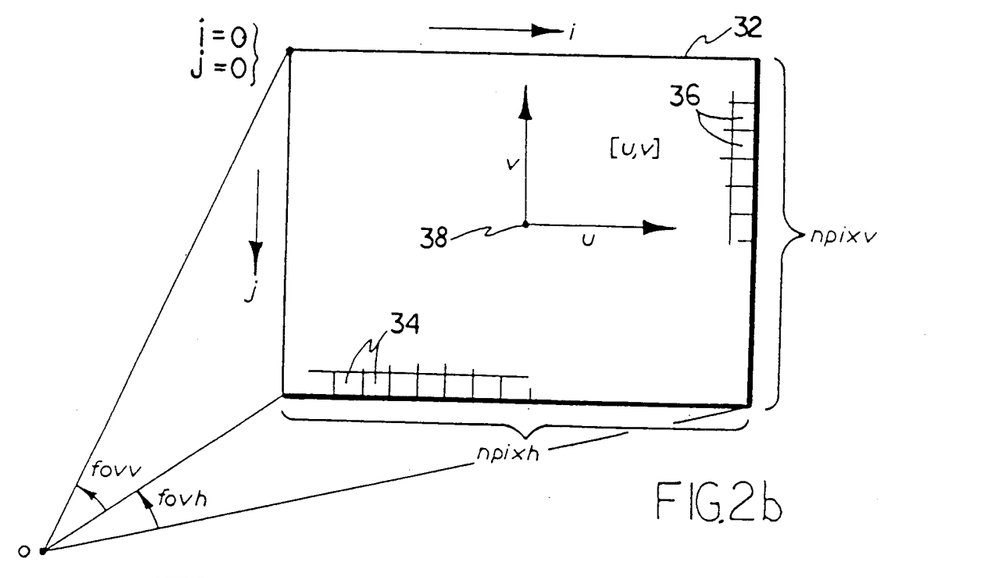

Referring to FIG. 2b it can be seen that the horizontal angle of field of view of the camera 12 is designated as fovh and the vertical angle of field of view is designated as fovv. The image plane 32 is rectangular and is positioned symmetrically with respect to the camera FOV, as is standard in most video cameras. Npixh is the number of pixels 34 in a horizontal line and npixv is the number of vertical rows of pixels 36. Image plane 32 (u,v) coordinates are given in tangent units, respectively horizontal and vertical, from the center 38 of the image plane 32. The following equations convert pixel coordinates to tangent coordinates:

$$u = (i - npixh/2) \times (\tan(fovh/2)/(npixh/2) \text{ and} \quad (1)$$

$$v = (j - nipxh/2) \times (\tan(fovh/2)/(npixv/2); \quad (2)$$

where i and j are the column number and row number, respectively, of a pixel from the upper left corner of the image plane 32. As used herein the symbol "×" denotes multiplication and the symbol "/" denotes division. The pixel coordinate to tangent coordinate conversion of Equations 1 and 2 corrects the camera 12 aspect ratio and simplifies the discussion of coordinate transformations and projections which follows. The inverse equations which yield pixel number from view angle are as follows:

$$i = u \times (npixh/2)/\tan(fovh/2) + npixh/2 \text{ and} \quad (3)$$

$$j = v \times (npixh/2)/\tan(fovh/2) + npixv/2. \quad (4)$$

For a typical CCD video camera having an 8.5 mm focal length and a conventional frame grabber the following relationships apply:
  npixh = 512 pixels;
  npixv = 480 pixels;
  fovh = 55 degrees;
  fovv = 42 degrees.

FIG. 3a illustrates, in accordance with one aspect of the invention, a zenith gazing camera 12 mounted to the robot 10. Distance from the camera 12 viewpoint to the ceiling 14 is "c". The image plane u-axis is aligned with a vehicle forward axis. Yaw angle, theta, is measured between the u axis and a long axis, designated as A, of the hallway. The image of the ceiling as viewed by camera 12 is illustrated in FIG. 3b.

Figure 3B:
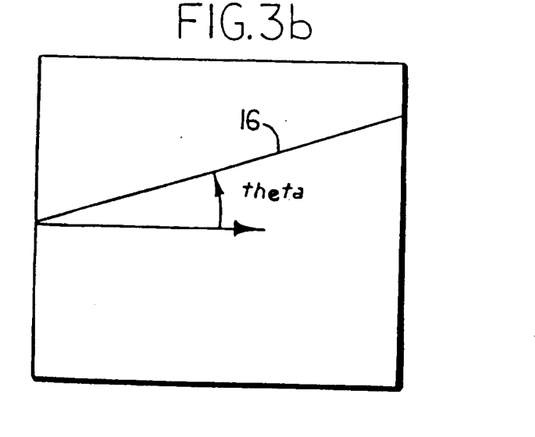

The angle of rotation of the ceiling image on the camera 12 image plane is equal to the vehicle yaw angle, as illustrated in FIGS. 3a and 3b. The precision of measurement accuracy depends in part on the accuracy of identifying a linear edge, or boundary, of a ceiling tape 16 and also upon the length of the boundary. In a typical environment, the edge of the tape 16 may subtend 100 pixels while the edge measurement may be accurate to within two pixels. This corresponds to approximately 0.2 radians accuracy in yaw measurement, or slightly more than one-half of a degree of angular measure.

Figure 3C:
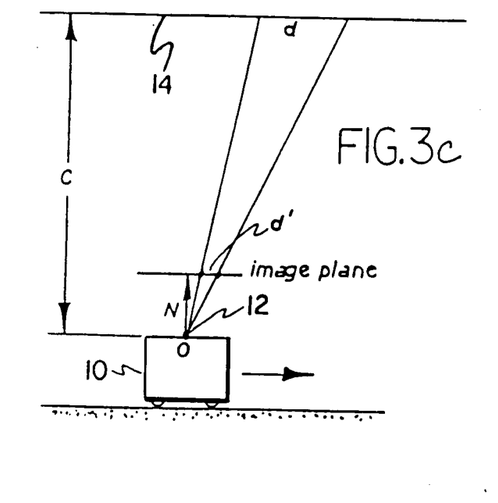

As the robot 10 moves a distance d along the floor 26, as measured by wheel encoders or odometers, the zenith projection of the view axis moves d units along the ceiling 14. Points in the image of the ceiling move distance d' in image plane u-v units. FIG. 3c illustrates this movement relative to vehicle 10 coordinates, that is, as if the vehicle 10 were stationary and the ceiling 14 moved distance d. An analysis of similar triangles yields the ceiling distance above the camera 12 viewpoint as:

$$c = d/d'. \qquad (5)$$

Generally $$d' = sqrt(u \times \times 2 + v \times \times 2), \qquad (6)$$

where "sqrt" indicates a square root function and "××" indicates exponentiation. Equation 6 reduces to $$d' = u \qquad (7)$$

for camera 12 horizontal lines aligned with the direction of motion.

Considering an example in which the camera 12 is 2.5 feet above the floor 26, the ceiling 14 has a height of 10 feet and the robot 10 moves two feet per second, then c=7.5 feet. In 250 milliseconds the robot 10 moves six inches. Therefore d'=d/c=0.5/7.5 or 0.0666 tangent units. For a camera 12 having a FOV of 55 degrees with 512 pixels per row, this motion corresponds to 32 pixels. If c is unknown in advance, an image motion of 32 pixels within 250 milliseconds implies that the ceiling 14 is 10 feet above the floor, it being given that the camera 12 height above the floor is 2.5 feet. Thus, ceiling height may be directly inferred.

The accuracy of motion measurement is derived from pixel "footprint" size on the ceiling 14 as follows. In the example given above the fovh=55 degrees thus one pixel represents u=tan(fovh/2)/256=0.002 tangent units. Hence, d=c×d'=7.5×0.002=0.15 feet or 0.18 inches. While this error term may exceed that of the instantaneous motion encoder accuracy it should be realized that this error term is absolute, not cumulative, over time. Thus, if motion encoder based measurements are accurate to approximately 1%, visual observation of the ceiling 14 surpasses motion encoder based dead reckoning accuracy after only 18 inches of floor travel. However, the vehicle 10 platform may wobble somewhat due to floor surface irregularities and absorption of acceleration in the suspension of the vehicle 10 platform. A two degree tilt of the vehicle 10 projects to a three inch error on the ceiling 14, or roughly 17 pixels. If wobble of this magnitude is common, one suitable method to reduce the effect of wobble on positional registration is to use zenith gazing visual observations at intervals of three feet or more of floor travel. Kalman filtering techniques, based on covariance matrices of uncertainties, may also be employed to merge visual and encoder based position estimates thereby maintaining absolute position control.

The footprint ("headprint") of the viewscreen on the ceiling 14 for the example given above is approximately eight feet. Using conventional CCD cameras and lenses, the FOV cannot readily be widened beyond approximately 55 degrees without inducing a "fisheye" type of distortion. This form of distortion, or aberration, distorts the linearity of images of lines, which in turn significantly complicates the geometry of image processing. A preferred solution to this limitation is to aim the camera 12 obliquely upward from the horizon, viewing an area of the ceiling ahead of the vehicle 10 and along a projected forward path of the robot.

The following description sets forth the geometry and calculations to infer vehicle orientation and lateral position in an environment, such as a hallway, from an image of ceiling tape. The following description makes use of an imaging device, such as a camera, which is pitched up obliquely at an intermediate angle between the horizon and the zenith. The ceiling tape is preferably aligned with the hallway. The ceiling tape may be arranged with its long axis parallel to or perpendicular to a long axis of the hallway. Preferably the light's alignment is substantially parallel to or perpendicular to the long axis of the hallway. The inferred axis of alignment is treated as a geometric line in the following discussion.

It is convenient to center the origin at the viewpoint of the camera 12 and to adopt right-handed Cartesian coordinates (x,y,z) aligned with the hallway as follows. The z-axis is vertical, the y-axis points down the hallway parallel to the long axis of the hallway and the x-axis is perpendicular to the long axis of the hallway. Position is referenced from the camera 12 and direction is referenced with respect to the walls of the hallway. Hence the designation "cam-wall" coordinates which will be employed hereinafter.

FIG. 4a illustrates the general configuration of the cam-wall coordinate system. The distance from a camera 50 to a ceiling 52 is c. The ceiling plane is characterized as -infinity<x<infinity, -infinity<y<infinity and z=c. The camera 50 is pitched up by an angle "Pch" radians and yawed over by an angle "Yaw" radians. There is no roll component in that camera raster lines are parallel to the ceiling, floor and horizon planes. Pch is measured from the x-y plane vertically to the viewplane normal vector N. Yaw is measured as the angle between the y-z plane and the vertical plane containing the vector N. From these definitions, it is apparent that the normal vector N is given by:

$$N = (x, y, z) = (\cos(Pch) \sin(Yaw), \cos(Pch) \cos(Yaw), \sin(Pch)). \qquad (8)$$

That is, the vertical component of N is sin(Pch). The horizontal component is cos(Pch), which decomposes into x and y components in the ratio cos(Yaw):sin(Yaw).

Perspective projection from cam-wall coordinates to image coordinates is illustrated in FIG. 4b. A general vector P=(x, y, z) in three dimensional space is connected to the origin by a straight line. It intersects the image plane 54 at $$P' = (x', y', z') = P/k = (x/k, y/k, z/k), \qquad (9)$$

which defines a scaled image of P. The scale factor k is the length of the projection of P onto the screen normal N, namely, $$k = P(dot)N \qquad (10)$$

by virtue of similar triangles ONP' and O(kN)P. The (dot) operation is a vector dot product given by $$k = x \times \cos(Pch) \times \sin(Yaw) + y \times \cos(Pch) \times \cos(Yaw) + z \times \sin(Pch). \qquad (11)$$

Image coordinates [u,v] from the center of the image plane 54 are expressed with respect to the unit vectors U and V, namely $$u,v] = u \times U + v \times V, \qquad (12)$$

where U and V are vectors and u and v are scalars. U is a horizontal unit vector perpendicular to the x-y plane footprint of N. In cam-wall coordinates, $$U = (\cos(Yaw), \sin(Yaw), O). \qquad (13)$$

V is a unit vector perpendicular at both N and U, that is, the vector cross product of N and U which is given by $$V = U \times N = \qquad (14)$$

$$\det \begin{bmatrix} I & J & K \\ \cos(Yaw) & \sin(Yaw) & O \\ -\cos(Pch)*\sin(Yaw) & \cos(Pch)*\cos(Yaw) & \sin(Pch) \end{bmatrix},$$

where I, J, K are the unit basis vectors of the (x, y, z) cam-wall coordinates.
That is, $$V = (\sin(Pch) \times \sin(Yaw), -\sin(Pch) \times \cos(Yaw), \cos(Pch)). \qquad (15)$$

The image plane 54 coordinates of the image of a point P are the projections of P' onto U and V, namely, $$u = P(dot)U \qquad (16)$$

$$v = P(dot)V \qquad (17)$$

which expands to $$u = (x/k) \times \cos(Yaw) + (y/k) \times \sin(Yaw), \text{ and} \qquad (18)$$

$$v = (x/k) \times \sin(Pch) \times \sin(Yaw) - (y/k) \times \sin(Pch) \times \cos(Yaw) + (z/k) \times \cos(Pch). \qquad (19)$$

A strip of ceiling tape along the axis of the hallway defines a line, LO, which is parallel to both the walls and the floor. In cam-wall coordinates, the equation of line LO is $$x = xO, y = s, z = zO \qquad (20)$$

where s is a line LO length parameter, which may range from plus to minus infinity. Values xO and zO are the lateral and vertical distances of the line from the viewpoint. The projection of this line onto the image plane 54 is $$u = (xO/k) \times \cos(Yaw) + (s/k) \times \sin(Yaw), \text{ and} \qquad (21)$$

$$v = (xo/k) \times \sin(Pch) \times \sin(Yaw) - (s/k \times \sin(Pch) \times \cos(Yaw) + (zo/k) \times \cos(Pch) \qquad (22)$$

where $$k = -xO \times \cos(Pch) \times \sin(Yaw) + s \times \cos(Pch) \times \cos(Yaw) + zO \times \sin(Pch). \qquad (23)$$

As s goes to infinity, u and v approach the limits, [u,v] $\propto$ [uu,vv], where $$uu = \sin(Yaw)/(\cos(Yaw)*\cos(Pch)) \qquad (24)$$
$$= \tan(Yaw)/\cos(Pch), \text{ and}$$

$$vv = -\tan(Pch). \qquad (25)$$

As seen in FIG. 4c the image of the line LO approaches a vanishing point 56 on the screen. This vanishing point 56 is the intersection of the images of all lines parallel to LO, i.e. with all possible choices of xO and zO. Intuitively, it is a point on a horizon where two parallel lines, such as railroad tracks, would appear to converge and meet. The horizon line in the image plane is the scanline through vv. Since Pch is fixed and known a priori, vv is also known from equation (25).

This converging line analogy is advantageously employed, in accordance with a method of the invention, to determine the value of uu. That is, select a line LO such as the line through A, C, E, G in FIG. 4f, and extend it to intersect the horizontal scanline through v = vv. The determined intersection point may lie physically off the image plane 54 but nevertheless yields the u value for the vanishing point, [uu, vv].

Specifically, let u(A), u(C), v(A) and v(C) be the u and v coordinates of points A and C, respectively. Then line LO through A and C is represented by the equation $$\frac{u - u(A)}{v - v(A)} = \frac{u(C) - u(A)}{v(C) - v(A)}$$

and, hence, $$uu = [vv - v(A)] \cdot \frac{u(C) - u(A)}{v(C) - v(A)} + u(A). \qquad (26)$$

Yaw is thus expressed as $$Yaw = \arctan(uu \times \cos(Pch)). \qquad (27)$$

It should be readily appreciated that the camera Yaw need not be aligned with the vehicle direction of travel, in which case a simple rotation of coordinates transports through the mathematical derivations. For navigation, this rotation angle offsets Yaw readings inferred by the system.

Returning briefly now to a consideration of FIG. 4a it should be recalled that once camera pitch (Pch) is known, ceiling height may be inferred from the motion of image features as the vehicle 10 moves along the floor. To further clarify the relevant geometry, it is useful to consider a coordinate system which aligns with the forward direction of the camera and vehicle motion. This is accomplished by rotating the x-y plane of the cam-wall coordinate system such that it aligns with the horizontal component of the image plane 54 normal N. FIG. 4d illustrates this new coordinate system. Note that the z-axis is in common with the cam-wall coordinates while the x-axis the y-axis are replaced by a u-axis and a w-axis whose basis vectors are $$U = (\cos(*Yaw), \sin(Yaw), 0) = \{1, 0, 0\}, \qquad (28)$$

$$W = (-\sin(Yaw), \cos(Yaw), 0) = \{0, 1, 0\}, \text{ and} \qquad (29)$$

$$Z = \{0, 0, 1\}. \qquad (30)$$

The brace notation $\{u, w, z\}$ denotes coordinates with respect to the basis U, W, Z which will be referred to herein as the "cam-floor" coordinates system. Both the cam-wall and cam-floor coordinate systems use the camera viewpoint as the origin 50. Conversion from $(x,y,z)$ to $\{u,w,z\}$ is accomplished by the transformation:

$$\{u, w, z\} = (x, y, z) \begin{bmatrix} \cos(Yaw) & -\sin(Yaw) & 0 \\ \sin(Yaw) & \cos(Yaw) & 0 \\ 0 & 0 & 1 \end{bmatrix} = \quad (31)$$

$$\{x^*\cos(Yaw) + y^*\sin(Yaw), -x^*\sin(Yaw) + y^*\cos(Yaw), z\}.$$

The inverse transformation is accomplished by $$(x, y, z) = \{u, w, z\} \begin{bmatrix} \cos(Yaw) & \sin(Yaw) & 0 \\ -\sin(Yaw) & \cos(Yaw) & 0 \\ 0 & 0 & 1 \end{bmatrix} = \quad (32)$$

$$(u^*\cos)(Yaw) - w^*\sin(Yaw), u^*\sin^*(Yaw) + w^*\cos(Yaw), z).$$

Referring to FIGS. 4b, 4c and 4e and considering the trajectory of a point P on the ceiling in cam-floor coordinates as the robot moves forward, u=uO, w=s and z=zO, where s is the parameter of distance travelled in direction W. The image of this line is derived by projection onto the image plane 54 as follows. The image plane U basis vector is the same as for cam-wall coordinates, as previously set forth in Equation 28.

The image plane 54 normal in cam-floor coordinates is given by $$N = \{0, \cos(Pch), \sin)Pch\} \quad (33)$$

and the image plane 54 basis vector (V) is $$V = \{0, -\sin(Pch), \cos)Pch\}. \quad (34)$$

Thus P projects onto the screen at $$P' = P/k = \{uO/k, s/k, zO/k\} \quad (35)$$

where $$k = P(dot)N = s \times \cos(Pch) + zO \times \sin(Pch). \quad (36)$$

Image plane 54 coordinates are derived by projecting P' onto U and V, $$u = P(dot)U = uO/k, \text{ and} \quad (37)$$

$$v = P(dot)V = -s \times \sin(Pch)/k + zO \times \cos(Pch)/k.$$

These image lines, which represent the streamlines of optic flow, all radiate from the vanishing point $$[uu, vv] = [O, -\tan(Pch)]. \quad (38)$$

Transforming the origin of image plane coordinates to this point, using the primed bracket to denote the new image plane coordinate system, $$[u', v'] = [u-uu, v-vv] \quad (39)$$

implies that an arbitrary optic flow line maps into $$[u', v']' = [uO/k, zo/(s=zO \times \tan(Pch)]', \text{ or}$$

$$[u', v'] = -[uO/k, zO/(k \times \cos(Pch)]'. \quad (40)$$

Thus, the slope of the optic flow line is $$v'/u' = zO/(uO \times \cos(Pch)). \quad (41)$$

It is noted that the v' component is independent of uO which simplifies the computation of ceiling height as will be shown.

FIG. 4e illustrates the w-z component of image plane and ceiling. The u-component can be ignored in computing zO as previously shown. As the vehicle 10 moves forward distance d in the direction W, the footprint ("headprint") of the screen moves distance d along the ceiling. Any point P1 moves distance d to P2; the corresponding images on the screen are P1' and P2', separated vertically by d' in the image plane. That is, v2'−v1'=d'.

As can be seen d' and d'' are a side and a base, respectively, of a triangle similar to the one formed by the image plane 54 w-axis and the line O-P2'. Thus, $$d''/d' = (1/\cos(Pch))/v2', \text{ or}$$

$$d'' = d'/(v2' \times \cos(Pch)) = (v2'-v1')/v2' \times \cos(Pch)). \quad (42)$$

Inasmuch as d'' and d are corresponding parts of similar triangles O-P1'-Q and O-P1-P2 whose altitudes, indicated by the vertical dashed lines in FIG. 4e, are $v1' \times \cos(Pch)$ and zO it can be realized that $$zO/d = v1' \times \cos(Pch)/d'', \text{ and} \quad (43)$$

$$zO = C = d \times v1' \times v2' \times \cos^2(Pch)/(v2'-v1') \quad (44)$$

Equation 44 gives ceiling elevation as a function of image plane 54 pitch and the image plane 54 vertical coordinates, [v1', v2'], of two successive images of a feature, the vehicle traveling a distance d between images. The ratio of d'' to d is the same as the ratio of the w-component of ranges from the origin to P1' and P1, respectively, by virtue of similar triangles O-P1'-R and O-P1-S. Thus, $$w1/d = (1/(\cos(Pch)-v2' \times \sin(Pch))/d'' \quad (45)$$

which implies $$w1 = d \times v2' \times (1-v1' \times \sin(Pch) - \times \cos(Pch))/(v2'-v1'). \quad (46)$$

Thus, the invention provides for range to be inferred from the same image data that yields ceiling height.

Lateral displacement of the robot 10 from the tracked ceiling feature is derived below.

Recalling from Equation 41 that the slope of the image line is $v'/u' = zO/(uO \times \cos(Pch))$ the lateral position of the tracked feature relative to the robot path (u-axis coordinate) is $$uO = (u1'/v1') \times zO/\cos(Pch), \text{ and} \quad (47)$$

$$uO = (u2'/v2') \times zO/\cos(Pch). \quad (48)$$

If ceiling height is known, either from a database, sonar readings, or from the optic flow analysis as described above, the position of the robot 10 with respect to the line LO, or any other measurable line, of the ceiling may be derived in hallway coordinates as described below. Robot pitch and yaw are also necessary inputs. As shown in the preceding discussion, pitch and yaw may be derived from the image plane 54 coordinates of the vanishing point 56.

The cam-wall origin and the line LO described previously define a plane known as an epipolar plane. The intersection of this plane with the image plane 54 yields an epipolar line, which is the locus of screen images of all possible points on LO. The direction of the epipolar line is perpendicular to both the normal of the image plane and the normal of the epipolar plane. A normal, in cam-wall coordinates, to the epipolar plane is given by $$E = (-zO, O, Xo). \quad (49)$$

The epipolar line direction is thus given by the cross product $$E \times N = (xO \times \cos(Yaw) \times \cos(Pch),$$
$$xO \times \cos(Pch) \times \sin(Yaw) + zO \times \sin(Pch),$$
$$-zO \times \cos(Pch) \times \cos(Yaw)) \quad (50)$$

To convert to image plane coordinates, this vector is projected onto the unit basis vectors of the image plane, or $Eu = (E \times N)(dot)U$ and $Ev = (E \times N)(dot)V$ which yields $$Eu = XO \times \cos(Pch) + zO \times \sin(Pch) \times \sin(Yaw), \text{ and} \quad (51)$$

$$Ev = -zO \times \cos(Yaw). \quad (52)$$

The slope of the epipolar line in the u-v plane is thus $$Ev/Eu = -zO \times \cos(Yaw)/xO \times \cos(Pch) + zO \times \sin(Pch) \times \sin(Yaw). \quad (53)$$

Therefore, lateral displacement (xO) from line LO can be derived from pitch, yaw, ceiling height (zO) and slope (m) of the image of LO on the image plane 54 as $$xO = -zO \times \cos(Yaw)/(m \times \cos(Pch)) - zO \times \sin(Pch) \times \sin(Yaw)/\cos(Pch). \quad (54)$$

EXAMPLE

The following example illustrates a sequence of operations for inferring orientation and lateral position relative to a line of retroreflective tape along a ceiling as viewed through an obliquely aimed camera.

Recalling from the discussion of FIG. 3a that in an appropriately illuminated and thresholded image of the ceiling the ceiling tape 16 stands out as a major visual feature. The two solid lines in FIG. 4c indicate the left and right boundaries of the tape 16. These lines converge at a vanishing point [ii, jj] in pixel coordinates. Pixel coordinates are converted to tangent units [uu, vv] using Equations 1 and 2. Pitch angle (Pch) is given by Equation 26 and the yaw angle by Equation 27.

Ceiling height (c) above the camera may be measured by measuring optic flow against forward travel, yielding a value for c as described in Equation 44. Using the value of c so obtained, or a sonar measurement of ceiling height, lateral displacement from the center line can be measured using the preceding derived values as given in Equation 54.

Alternatively, exact position with respect to an arbitrary ceiling feature may be derived together with the ceiling height measurement as, $$c = d^* v1'^* v2'^* \cos(Pch)/(v2' - v1'), \quad (55)$$

$$u = (u2'/v2')^* c/\cos(Pch) \quad (56)$$

$$w = d^* v2'^* (1 - v1'^* \sin(Pch)^* \cos(Pch))/(v2' - v1'). \quad (57)$$

Equations 55-57 may be readily solved with, for example, the data processor 18D of FIG. 1b. Four image data points per frame are sufficient to determine the vanishing point VP. The computation is a 2-by-2 matrix inversion, applied once to solve the intersection of the lines. Next, pitch and yaw are computed. Generally, pitch remains fixed during movement down a hallway. Also, ceiling height typically needs to be computed but once on entering a hallway. Alternatively, ceiling height may be derived from a sonar measurement or be an element of a stored database related to a map of the robots' anticipated path or environment, thereby eliminating the need for a computation of c. Regardless of the source of the data, ceiling height will generally remain fixed for sufficiently long distances along the path of the robot such that it imposes insignificant computational burdens. Inference of lateral drift of the robot generally requires eight multiply/divides and one add, on a per frame basis, not per pixel.

The foregoing description of the invention has been presented in the context of a vehicle such as mobile robot which navigates through an environment having an overlying planar surface, such as a ceiling, and visually distinct linear features such as strips of retroreflective tape disposed thereon. It should be appreciated that the teaching of the invention is applicable to a number of applications and environments other than those disclosed above. In that those having skill in the art may derive modifications to what has been taught above it is intended that the invention not be limited to only the above described embodiments but, instead, that the invention be limited only as set forth in the Claims which follow.

What is claimed is:

1. Navigation apparatus for generating navigation related information for a vehicle, comprising:

means for obtaining an image of a surface which overlies a vehicle or a projected path of the vehicle, the surface having one or more retroreflective features disposed thereon;

means for illuminating the retroreflective features;

means, coupled to said obtaining means, for detecting a location within the image of the one or more retroreflective features; and means, coupled to said detecting means, for generating, from the detected feature location or locations, at least vehicle position and orientation information, wherein said image obtaining means comprises means for forming a two-dimensional image comprised of a plurality of image pixels, wherein said detecting means comprises means, coupled to said two-dimensional image forming means, for identifying pixels which correspond to two opposing edges of the retroreflective feature, and wherein said generating means comprises means, coupled to said pixel identifying means, for projecting a line from the pixels that correspond to each of the opposing edges of the feature, an intersection of the projected lines defining a vanishing point.

2. Navigation apparatus as set forth in claim 1 wherein said generating means comprises:
   means for determining an offset distance and an angular displacement of the vehicle relative to the location of the feature within the image.

3. Navigation apparatus as set forth in claim 1 wherein said generating means comprises means for determining a distance from the vehicle to the surface.

4. Navigation apparatus as set forth in claim 1 wherein said two-dimensional image forming means is comprised of a CCD camera means.

5. Navigation apparatus as set forth in claim 1 wherein said two-dimensional image forming means is comprised of a vidicon camera means.

6. Navigation apparatus as set forth in claim 1 wherein said generating means further comprises:
   means for determining an offset distance and an angular displacement of the vehicle relative at least to the line projected from the pixels.

7. Navigation apparatus as set forth in claim 1 wherein said means for illuminating is comprised of a pulsed source of IR illumination.

8. Navigation apparatus as set forth in claim 1 wherein said identifying means includes means for executing a binary subdivision search.

9. Navigation apparatus as set forth in claim 1 wherein said generating means includes means for determining a location within the two-dimensional image of an epipolar line.

10. Navigation apparatus for generating navigation related information for a mobile robot, comprising:
   means for imaging at least a portion of a ceiling disposed over a forward path of a mobile robot, said imaging means including means for forming a two-dimensional image represented as a two-dimensional array having rows and columns of image pixels;
   means for searching the two-dimensional array of image pixels to identify two-dimensional array coordinates of image pixels, located in a plurality of rows of the two dimensional array, that correspond to oppositely disposed boundaries of at least one substantially linear retroreflective ceiling feature;
   means for generating a reference axis of robot motion relative to the identified two-dimensional array coordinates of the image pixels located in the plurality of rows of the two-dimensional array; and
   means for determining a position of the robot relative to the reference axis of robot motion.

11. Navigation apparatus as set forth in claim 10 wherein said imaging means is comprised of a camera means.

12. Navigation apparatus as set forth in claim 10 and further comprising an IR light source for illuminating the retroreflective feature.

13. Navigation apparatus as set forth in claim 10 and further comprising means for measuring a height of the ceiling relative to the robot.

14. Navigation apparatus as set forth in claim 10 and further comprising means, coupled to said determining means, for controlling a motion of the robot relative to the reference axis of robot motion.

15. Navigation apparatus as set forth in claim 10 wherein the generating means includes means for converting the identified two-dimensional array coordinates to tangent coordinates.

16. Navigation apparatus as set forth in claim 10 where the imaging means is aimed obliquely along a forward path of the robot at an angle greater than zero degrees and less than ninety degrees.

17. A method of providing navigation related information for a mobile robot, comprising the steps of:
   obtaining at least one image of a ceiling having one or more distinct retroreflective linear visual features, the ceiling overlying at least a projected path of the robot;
   locating within the ceiling image the one or more distinct retroreflective linear visual features;
   detecting an edge boundary of at least one of the features;
   generating at least one reference line relative to the edge detected boundary; and
   determining a location of the robot relative to the at least one reference line, wherein
   the step of generating at least one reference line includes a step of projecting perspective lines along detected edge boundaries, an intersection of the projected perspective lines defining a vanishing point.

18. The method of claim 17 wherein the step of obtaining an image includes a step of generating a plurality of image pixels each of which has a value which is a function of at least a brightness of a corresponding portion of the ceiling.

19. The method of claim 18 wherein the steps of locating and detecting each include a step of identifying a pixel or pixels having a value which indicates a location within the image of the retroreflective linear visual feature.

20. The method of claim 18 wherein the step of detecting an edge boundary includes a step of processing image pixels by a procedure selected from the group consisting of a binary subdivision search procedure, a Hough transform procedure, an edge detection and linking procedure, a curve fitting procedure, and combinations and variations thereof.

21. The method of claim 17 wherein the step of determining a position includes a step of determining an offset distance from the robot to the reference line.

22. The method of claim 21 wherein the step of determining a position includes a further step of determining an angular orientation of the robot relative to the reference line.

23. The method of claim 17 wherein the step of determining a location of the robot relative to the reference line includes the steps of:
   determining a height of the ceiling overlying the projected path of the robot; and
   employing the determined ceiling height to determine a lateral displacement of the robot relative to the reference line.

24. A method of providing navigation information for a vehicle, comprising the steps of:
   imaging a surface which is disposed above at least a projected forward path of the vehicle, the surface having a height z0 above the vehicle, the surface including one or more substantially linear retroreflective features;
   detecting along a first image scan line two opposing edges of the feature;
   detecting along a second image scan line two opposing edges of the feature;
   determining a vanishing point relative to the image from the detected opposing edges, an axis of vehicle alignment intersecting the vanishing point;

projecting the axis of alignment onto the image to obtain a slope m;

determining a pitch (Pch) component and a yaw (Yaw) component of vehicle orientation relative to the axis of alignment; and determining a lateral displacement xO of the vehicle from the axis of alignment in accordance with the equation:

$$xO = -zO \times \cos(Yaw)/(m \times \cos(Pch)) - zO \times \sin(Pch) \times \sin(Yaw)/\cos(Pch).$$

25. A method as set forth in claim 24 wherein the vanishing point is defined by coordinates uu and vv and wherein the yaw component is determined in accordance with the equation $$Yaw = \arctan(uu \times \cos(Pch)).$$

* * * * *